Patented Feb. 13, 1934

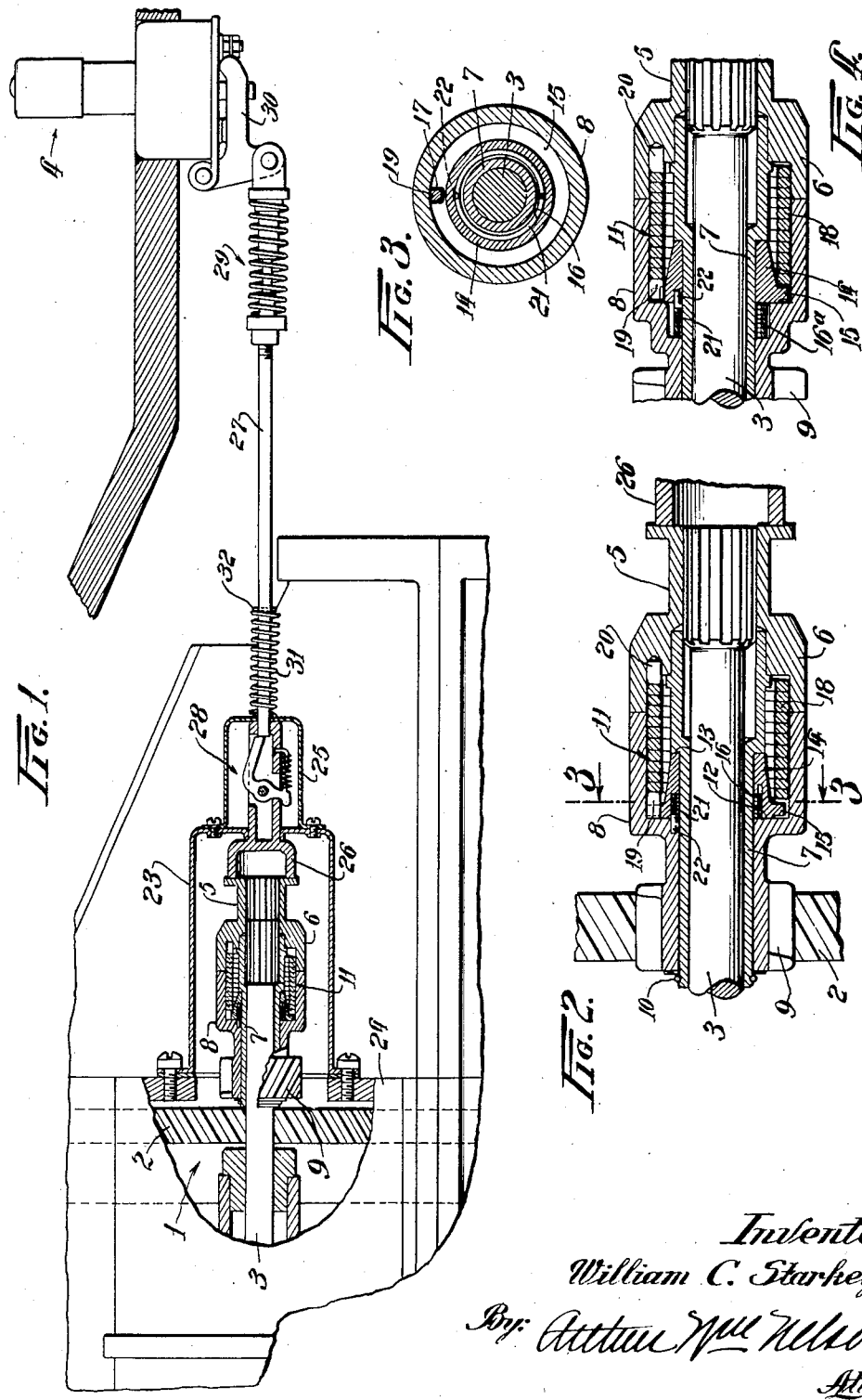

1,946,816

UNITED STATES PATENT OFFICE 1,946,816

SPRING CLUTCH

William C. Starkey, Indianapolis, Ind., assignor to L. G. S. Devices Corporation, Indianapolis, Ind., a corporation of Indiana Application January 7, 1931. Serial No. 507,061

7 Claims. (Cl. 192—41)

This invention relates to improvements in spring clutches and it consists of the matters hereinafter described and more particularly pointed out in the appended claims.

The clutch with which my invention is more particularly concerned is of the type embodying a pair of coaxial cup shaped members adapted to enclose a clutching spring which permits of a comparatively free relative rotation between said members in one direction and acts upon a relative rotation between said members in the other direction to clutch said members together. The clutch is herein shown and described as embodied in the pinion of an engine starter, wherein said pinion is manually moved into engagement with the gear on the engine fly wheel but as will be apparent, the invention may also be embodied in other mechanisms where the peculiar characteristics thereof make it of advantage to do so.

Heretofore in clutches of this kind when used in starter mechanism, their sensitivity changed with surrounding temperature. In low temperatures the lubricant in the cup members of the clutch congeals and becomes stiff and as the spring employed is of a substantially larger cross section when considered with respect to the enclosing recess in said members, said congealed lubricant offered such a resistance to the spring as to retard its action.

One object of the invention is to provide a clutch of this kind wherein the main clutch spring is caused to gradually and smoothly clutch from one end to the other, through the action of a more sensitive energizing spring associated with the first mentioned end of the spring upon a relative rotation of the coaxial clutch members in one direction.

In constructions heretofore proposed there is danger of the heavy congealed oil preventing metal to metal contact between the spring and the member to be gripped, thus lowering the coefficient of friction between the parts to such an extent that proper gripping action can not be secured.

Hence another object of the invention is to provide a spring clutch which is unaffected in clutching action by the congealing or stiffening of the lubricant and in which the spring turns shall be able to make proper metal to metal contact even though the grease or oil becomes heavy and congealed.

A further object of the invention is to provide a clutch of this kind which though having a lighter overrunning action to insure longer periods of usefulness, is positive in its clutching and declutching actions.

These objects of the invention as well as others, together with the many advantages thereof will more fully appear as I proceed with my specification.

In the drawing:—

Fig. 1 is a longitudinal sectional view through a clutch embodying my invention and illustrates the same in the position it occupies with respect to associated parts of an automobile or like engine starter.

Fig. 2 is a longitudinal vertical sectional view through the clutch on an enlarged scale.

Fig. 3 is a transverse vertical sectional view through the same as taken on the line 3—3 of Fig. 2.

Fig. 4 is a view similar to Fig. 2 illustrating a slightly modified form of construction.

Referring now in detail to that embodiment of the invention illustrated in the accompanying drawing and especially to Figs. 1, 2 and 3 thereof, 1 indicates the fly wheel of the engine to be started, which fly wheel is provided with a helical peripheral gear ring 2. A starting motor (not shown) is arranged with its shaft 3 parallel with the axis of the fly wheel and with its end projecting rearwardly beyond the plane of said fly wheel. 4 indicates the foot actuated switch for said motor which when depressed first moves a starter pinion into engagement with the ring gear and then connects up the starting motor with a suitable source of current supply to energize the same whereby its shaft 3 is rotated.

The rear end of the shaft 3 has a splined connection with the hub 5 of a cup shaped clutch member 6 and a long bushing 7 in which said end of the shaft has bearing, is anchored at its rear end in said clutch member. Coacting with said cup shaped clutch member 6 is a second cup shaped clutch member 8 that is journalled on the bushing 7. The front end of said clutch member 8 is formed to provide a helical pinion 9 adapted for engagement with the gear ring 2 of the fly wheel 1. Said clutch member 8 is held against endwise movement on the bushing 7 by means of a spring ring 10 which engages the front end of said bushing.

The clutch members 6 and 8 coact to provide a clutch spring chamber 11 and in said chamber between shoulders 12 and 13 on the clutch member 8 and bushing 7 respectively, is an energy transmitting collar 14 having a radial flange 15 at its front end, which end engages the shoulder 12. Said end of said collar has an annular recess 16 therein and the flange 15 is provided with a radial recess 17 the purpose of which will soon appear.

In the chamber 11 as provided by said clutch members 6 and 8 is located a main clutch spring 18 having end parts or toes 19 and 20 bent parallel with its axis. The toe 19 is adapted to be entered into the recess 17 of the collar flange 15 while the toe 20 is adapted to be entered into a pocket provided therefor in the clutch member 6. It is mentioned in passing that the spring is a left hand wound spring and is of such a diameter when in its normal unstressed condition as to fit fairly close but has clearance with respect to the parts of the members 6 and 8 defining the chamber 11.

Located in the recess 16 of the collar 14 is a second and auxiliary or energizing clutch spring 21 having one end 22 bent to extend into a pocket in the clutch member 8 and having its other end ground flat to engage the end wall of the recess 16 in said collar. This spring 21 is a left hand wound spring as is the spring 18.

The clutch described is disposed in a housing 23 secured in any suitable manner to a casing wall 24 enclosing the rear end of the starting motor shaft and this housing includes an extension 25. In said casing is located a thrust member 26, in such a manner as to be endwise movable therein. This thrust member is actuated in one direction by a rod 27, a latch device 28 being interposed between the thrust member and rod 27 and operating when the rod 27 is moved endwise and forwardly to impart similar movement to the thrust member. When the forward limit of movement has been reached by said thrust member and rod, the latch by reason of its engagement with the end of the casing 23 trips and breaks connection between the thrust member and rod so that said thrust member can move rearwardly independent of said rod.

The rear end of said rod is connected through a cushioning spring device 29 with a bell crank lever 30 that is actuated in the depression of the switch 4 to impart a forward movement to said rod. A spring 31 that surrounds said rod 27 between a cross pin 32 and the end of the housing extension 25 acts to return said rod to its normal position when foot pressure is released from the switch 4.

When it is desired to start the engine of which the fly wheel 1 forms a part, foot pressure is imposed upon the switch 4 which through the bell crank lever 30, rod 27 and latch 28, together with the member 26 will move the cup members 6 and 8 of the clutch forward to cause the pinion 9 to engage the ring gear 2. The switch 4 is so timed that as the pinion enters engagement with the ring gear, the circuit is completed to the starting motor which becomes energized to rotate its shaft 3. By reason of the splined connection the hub 5 of the cup member 6 of the clutch, has with the rear end of said shaft, the spring is rotated in a direction to unwind the same. As the other end of the clutch spring is engaged in the recess 17 of the collar 14, said collar turns with the spring 18 and this will cause the spring 21 in said collar to unwind and to radially expand to clutch the collar to the cup shaped clutch member 8. This resists the further turning movement of the front end of the main clutch spring which because of its still being driven by the clutch member 6, causes said spring to radially expand and clutch the two cup shaped members 6 and 8 together. As the pinion 9 at this time is in engagement with the ring gear 2 of the fly wheel, the same now acts to turn over or crank the engine.

So soon as the engine turns over under its own power, the pinion 9 is driven by the fly wheel at a greater speed than that of the shaft 3 and due to the helical formation of the ring gear and pinion, the latter is repelled and moved rearwardly, it being understood that foot pressure has been removed from the switch 4 at this time to allow such rearward movement of the clutch member and its actuating rod.

As the pinion 9 and associated clutch member 8 are being simultaneously rotated and moved rearwardly, the spring 21 is wound up and caused to contract radially to break the clutching connection between said spring and sleeve or collar 14. This releases said collar 14 from the cup shaped clutch member 8 and as the restraining action on the front end of the main clutch spring is thus released, it assumes its normal condition and breaks the clutched engagement between the cup members 8 and 6.

By reason of the use of the spring 21 which as before mentioned is of a relatively small cross sectional-diameter, no appreciable resistance is offered thereby to any lubricant with which the clutch is usually packed, and especially when such lubricant has congealed and become stiff due to low temperature.

Thus said spring operates under any condition of lubricant to energize one end of the clutch spring 18 and cause the same to gradually expand radially from said end into full clutching engagement between the two cup shaped clutch members.

By use of the structure described, it is possible to employ the energizing or auxiliary clutching spring without increasing the length of the cup member 8 so that said cup members easily fit within the small space allotted therefor in a starting mechanism of this kind.

In Fig. 4, I have shown a slightly modified form of construction wherein the recess for the spring 21 instead of being provided in the sleeve or collar 14, is provided in the cup member 8 and such a recess is indicated by the numeral 16a. With such an arrangement the toe 22 of said spring will be disposed in a small recess in the sleeve 14. The operation of such an arrangement of parts is the same as above set forth with references to the structure shown in Figs. 1, 2 and 3.

While in describing the invention, I have referred in detail to the form and arrangement of the parts thereof, the same is to be considered merely as illustrative so that I do not wish to be limited thereto except as may be specifically set forth in the appended claims.

I claim as my invention:—

1. A spring clutch embodying therein two relatively rotatable coaxial members formed to provide a chamber, a main clutch spring located in said chamber and normally having a clearance with respect to the annular wall of said recess and operatively connected at one end to one of said members, means in said chamber mounted for a relative turning movement with respect to the other member and to which the other end of the clutch spring is operatively connected and a second and lighter clutch spring of a diameter smaller than that of the main clutch spring disposed between said other member and said means and operating in one relative movement between said coaxial members to clutch said means to said other member to energize said main clutch spring from that end thereof connected thereto for clutching said two coaxial members together.

2. A spring clutch embodying therein two relatively rotatable coaxial members formed to provide a chamber, a main clutch spring in said chamber and normally having a clearance with respect to the annular wall of said chamber and operatively connected at one end to one of said members, a bushing secured to said last mentioned member and upon which the other of said members is journalled, a collar in said chamber and rotative on said bushing, means providing a connection for the other end of said clutch spring with said collar and means providing a more sensitive overrunning energizing spring clutch connection between said second mentioned member and said collar.

3. A spring clutch embodying therein two relatively rotatable coaxial members formed to provide a chamber and a main clutch spring in said chamber and normally having a clearance with respect to the annular wall of said chamber and operatively connected at one end to one of said members, a bushing secured to said last mentioned member and upon which the other of said members is journalled, a collar in said chamber and rotative on said bushing, and having a recess in that end adjacent said second member and an overrunning spring disposed in said recess of said collar to clutch said collar to said other member whereby said collar acts to hold its associated end of the main clutch spring so that the same expands into clutching engagement in said chamber upon a relative rotation between said members.

4. A spring clutch embodying therein two relatively rotatable clutch members, a clutch spring having a portion so operatively engaged with one of said members as to be rotative therewith, the other member having a surface arranged to be gripped by said spring upon a change in its diameter in one direction, means mounted for rotation on a part fixed with respect to the first mentioned member and also relatively rotative with respect to said other member, the other end of said clutch spring being operatively connected to said means, and a second clutch spring operatively engaged at its ends with said means and with said other clutch member respectively and operating in a relative rotation between said clutch members in one direction to energize the first mentioned clutch spring into clutching engagement with said surface to clutch said two clutch members together.

5. A spring clutch embodying therein two relatively rotatable clutch members, a clutch spring having a portion so operatively engaged with one of said members as to be rotative therewith, the other member having a surface arranged to be gripped by said spring upon a change in its diameter in one direction, a third member mounted for rotation on a part fixed with respect to said first mentioned member and also relatively rotatable with respect to said other member and to which third member the other end of said coil clutch spring is operatively connected, and a second coil spring of a diameter less than that of the first mentioned one, said second coiled spring being disposed in a recess in said third member and operating in a relative rotation between said clutch members to cause said third member to energize the first mentioned clutch spring from that end operatively connected thereto.

6. A spring clutch embodying therein two relatively rotatable clutch members, one of which includes a tubular extension, the other clutch member being formed to provide an internal clutch surface surrounding a part of said tubular extension but radially spaced therefrom, a clutch spring surrounding said tubular extension and so operatively connected at one end to said member having said extension as to be rotative therewith, a third member mounted on said extension for relative rotative movement with respect thereto and with respect to said other member and having the other end of said clutch spring operatively connected thereto, and a second coil clutch spring disposed in a recess in said third member and operatively connected at its ends to said third member and to said other clutch member respectively and operating in a relative rotation between said clutch members in one direction to clutch said third member to said other clutch member and cause said coil clutch spring to change its diameter to grip against said surface.

7. A spring clutch embodying therein a driving clutch member and a driven clutch member, the driving clutch member having a part on which the driven clutch member is rotatively mounted and which driven clutch member has an internal clutching surface, a third member rotative on said part of the driving clutch member, a main clutch spring connected at one end to the driving clutch member and surrounding said part thereof and operatively connected at its other end to said third member, and a second and more resilient clutch spring also surrounding a portion of said part of the driving clutch member and operatively connected to said driven clutch member and to said third member respectively.

WILLIAM C. STARKEY.